United States Patent
Nieminen et al.

(10) Patent No.: US 6,293,209 B1
(45) Date of Patent: Sep. 25, 2001

(54) PROCESS FOR TREATING A MATERIAL CONTAINING METAL AND ORGANIC MATTER, INCLUDING METAL SEPARATION

(75) Inventors: Matti Nieminen; Esa Kurkela, both of Espoo (FI)

(73) Assignee: Valtion Teknillinen Tutkimuskeskus (FI)

( * ) Notice: Subject to any disclaimer, the term of this patent is extended or adjusted under 35 U.S.C. 154(b) by 0 days.

(21) Appl. No.: 09/355,302

(22) PCT Filed: Dec. 18, 1998

(86) PCT No.: PCT/FI98/00994

§ 371 Date: Sep. 8, 1999

§ 102(e) Date: Sep. 8, 1999

(87) PCT Pub. No.: WO99/32673

PCT Pub. Date: Jul. 1, 1999

(30) Foreign Application Priority Data

Dec. 19, 1997 (FI) .......................................... 974573
Mar. 27, 1998 (FI) .......................................... 980697

(51) Int. Cl.[7] ...................................................... F23J 15/00
(52) U.S. Cl. .......................... 110/345; 110/215; 110/216; 110/245; 110/342; 75/671
(58) Field of Search ................................... 110/203, 215, 110/216, 243, 244, 245, 342, 344, 345, 10 KD; 75/414, 671, 672, 673, 674, 675, 676, 677, 678, 679, 680, 686, 687, 681–685, 961

(56) References Cited

U.S. PATENT DOCUMENTS

| 1,881,872 | * | 10/1932 | Neuman | 75/10.29 |
| 4,261,736 | * | 4/1981 | Dewing et al. | 75/68 A |
| 4,488,512 | * | 12/1984 | Boyle | 122/4 D |
| 4,931,259 | * | 6/1990 | Okamoto et al. | 422/143 |
| 4,947,804 | * | 8/1990 | Abdulally | 122/4 D |
| 4,960,057 | * | 10/1990 | Oshita et al. | 110/345 |
| 5,022,330 | * | 6/1991 | Burgher et al. | 110/238 |
| 5,242,662 | * | 9/1993 | Toth | 422/142 |
| 5,339,774 | * | 8/1994 | Tang | 122/4 D |
| 5,364,443 | * | 11/1994 | Tremblay et al. | 75/403 |
| 5,644,996 | * | 7/1997 | Wimby et al. | 110/245 |
| 5,667,556 | * | 9/1997 | Orth et al. | 75/450 |
| 5,735,682 | * | 4/1998 | Toth | 431/170 |

FOREIGN PATENT DOCUMENTS 1935568   1/1971   (DE) .

* cited by examiner

Primary Examiner—Henry Bennett
Assistant Examiner—K. B. Rinehart
(74) Attorney, Agent, or Firm—Ware, Fressola, Van Der Sluys & Adolphson LLP

(57) ABSTRACT

A process for treating a raw material containing aluminum or a similar metal melting at a low temperature and organic matter, including metal separation, particularly intended for the treatment of liquid container rejects consisting of aluminum foil, polymer material and possible fibre residues in order to recover the aluminum and to utilise the organic matter as a fuel. The raw material is introduced in a bubbling fluidised bed, where the organic matter is gasified at a temperature higher than the melting point of the metal present. The gas removed from the fluidised bed and the entrained metal are subsequently cooled to a temperature below the melting point of metal by admixing a cooling medium such as water in the gas flow. The solid metal particles are eventually separated from the gas e.g. with a cyclone and the gas flow is possibly filtered before combustion.

14 Claims, 2 Drawing Sheets

# PROCESS FOR TREATING A MATERIAL CONTAINING METAL AND ORGANIC MATTER, INCLUDING METAL SEPARATION

TECHNICAL FIELD

This invention relates to a process for treating a raw material containing aluminium or a similar metal melting at a low temperature and organic matter, including metal separation.

BACKGROUND OF THE INVENTION

Raw materials to be treated in accordance with the invention consist primarily of packaging waste containing metallic aluminium, which in addition to aluminium foil comprise polymer material and possibly also fibre residues. The treatment aims to utilise the calorific power of the organic matter and/or to recover the valuable aluminium or other similar metal.

The utilisation of such waste material containing aluminium for energy production has been very difficult or even impossible to control by means of combustion or gasification techniques known so far. The problems have been due to the ash component, which melts at a low temperature considering the conversion techniques applied, and thus tends to form detrimental deposits on the walls of the reaction space, and also to cause sintering of the fluidised bed and other process failures. At the same time, in the cases where aluminium recovery has been the aim, the recovery has been deficient.

SUMMARY OF THE INVENTION

The purpose of this invention is to provide a solution for treating packaging waste containing metal aluminium or a similar raw material containing both readily melting metal and organic matter, which overcomes the problems mentioned above and which, depending on the situation, enables both the organic matter and the metal to be utilised and recovered. The method in accordance with the invention is characterised by the fact that the raw material containing metal and organic matter is introduced in a bubbling fluidised bed, where the organic matter is gasified at a temperature higher than the melting point of the metal present, that the gas removed from the fluidised bed and the accompanying metal are cooled to a temperature below the melting point of metal by admixing a cooling medium into the gas flow, and that solid metal particles are subsequently separated from the gas.

It has been confirmed in accordance with the invention that gasification performed at a controlled temperature in the fluidised bed and subsequent cooling of the gas removed from the fluidised bed allow the metal to be converted to solid particles entrained by the gas flow without the metal and/or ashes adhering to the suspended particles in the fluidised bed, to the walls of the reaction space and to the gas exhaust ducts. Assumingly, the molten metal particles formed in the fluidised bed are immediately covered with a protective oxide layer, which reduces the adhesion of the particles substantially. Moreover, an adequate shape of the reaction space can prevent the particles from hitting the walls, to which they might adhere. The bubbling fluidised bed required in the invention, in contrast to the particles circulating in a circulating reactor, is produced by controlling the fluidisation rate so that the fluidised bed has a specific, essentially constant height in the reaction space. These circumstances result in stable process conditions, which are crucial for the process to succeed.

With the process of the invention, the organic matter contained in packaging waste or other similar raw material can thus be gasified and utilised for energy production without interference of the metal present, at the same time as the metal can be recovered for possible recycling. Energy production may be the chief purpose of the process, the recovered metal being then a by-product whose potential value may increase the profitability of the process. However, the main purpose of the process may equally well be to recover the valuable metal by removing organic matter to be gasified, and in that case the gas, which may perhaps be exploited, will constitute a by-product of the process.

Raw materials to be utilised in accordance with the invention are primarily the polymer material and packaging waste containing aluminium mentioned above, such as plastic/aluminium wrappings and a reject fraction containing aluminium, polymer material and fibre residues produced in the recycling of liquid containers. Such a fraction, which contains approx. 5 to 15% of metallic aluminium and in which fibres account for approx. 1%, is the remainder of recycled liquid containers from which the fibrous layer has been torn off for defibration. The waste material mentioned here can be introduced in a fluidised bed in the form of chip-like or stripe-like pieces having a diametre of approx. 0.5 to 5 cm. The material of the particles suspended in the fluidised bed may vary depending on the quality of the raw material to be treated and the process goals. If the metallic aluminium is to be recovered in as pure a form as possible, the particles used are preferably a nearly ungrindable material, such as sand or aluminium oxide. By contrast, in the treatment of an easily tar-forming raw material, not aiming at the recovery of pure metal, the suspended particles may also consist of a grindable material, such as limestone or dolomite. Should molten material adhere to the suspended particles in the course of time, the particles may be replaced while maintaining the particle size within the fixed limits. The appropriate particle diametre of sand for instance is in the range from 0.3 to 1 mm.

In accordance with the invention, the gasification temperature prevailing in the fluidised bed is preferably approx. in the range from 670 to 900° C., which exceeds the melting point of aluminium and is sufficient for the gasification of polymers used in packaging materials. If the material includes fibres, the gasification temperature is preferably at least approx. 850° C. The temperature of the fluidised bed is controlled by means of the feed ratio of the raw material to be treated to the fluidised gas, which appropriately is air or a mixture of air and water vapour, i.e. with the air coefficient, so as to reach a temperature above the melting point of metal and at the same time a temperature equal to or higher than the melting point of the ashes produced. Depending on the material, the temperature of the fluidised bed can be maintained under control at a temperature which is up to 150 to 200° C. higher than the theoretical melting point of inorganic ash material. The fluidisation rate, which is preferably more than four times as high as the minimum fluidisation rate ($V_{mf}$), and the height of the fluidisation bed depending on this are used to adjust the retention time in the reaction space such that the organic matter reacts effectively with oxygen, water vapour and any reactive gases present. The fluidisation rate is typically in the range from 0.5 to 3.0 m/s. The reaction products of the organic matter and the gasification gases are mainly gaseous and there is a low proportion of heavier, condensable hydrocarbons possibly present.

In a fluidised bed whose temperature exceeds the melting point of the metal contained in the raw material, the metal may melt or even vaporise at least partly. However, detrimental agglomeration or sintering of molten metal is avoided by means of the gasification conditions, such as the temperature, the retention time, the shape of the reaction space and oxygenation of the surface of any molten particles, as mentioned above. The gasification reaction preferably takes place in a vertical reaction vessel with straight and plane walls, where the risk of the gas and the entrained particles hitting solid obstacles is reduced to a minimum.

The cooling medium is preferably introduced in the gas flow above the fluidised bed in the same vertical reaction vessel. The feeding causes the temperature of the gas and the entrained particles to drop below the melting point of metal, preferably to a temperature below 600° C. Water injected into an ascending gas flow is an effective cooling medium, however, cold nitrogen gas or mixtures of nitrogen and water may also be used.

After cooling, solid metal particles are separated from the gas flow, most effectively by means of a cyclone. For metal particles, ashes and any unreacted residual carbon to be separated on the basis of their density and particle size, several successive cyclones with varied dimensions may be used. The final separation of ashes and dust from the gas flow can be performed with filtering subsequent to the cyclone. A high-temperature filter can be used, or optionally, in case the gas is cooled between these, a bag filter can be used. In the latter case, tars may entail clogging problems, which may, however, be avoided by cracking the tars between the cyclone separation and the filtering.

In the separation of metal particles and other solid particles from the gas flow, it is also possible to use filters alone instead of cyclones.

BRIEF DESCRIPTION OF THE DRAWINGS

The invention will be described in further detail below with reference first to the accompanying drawing (FIG. 1), followed by embodiment examples of the process in accordance with the invention.

BEST MODE FOR CARRYING OUT THE INVENTION

Figure 1:
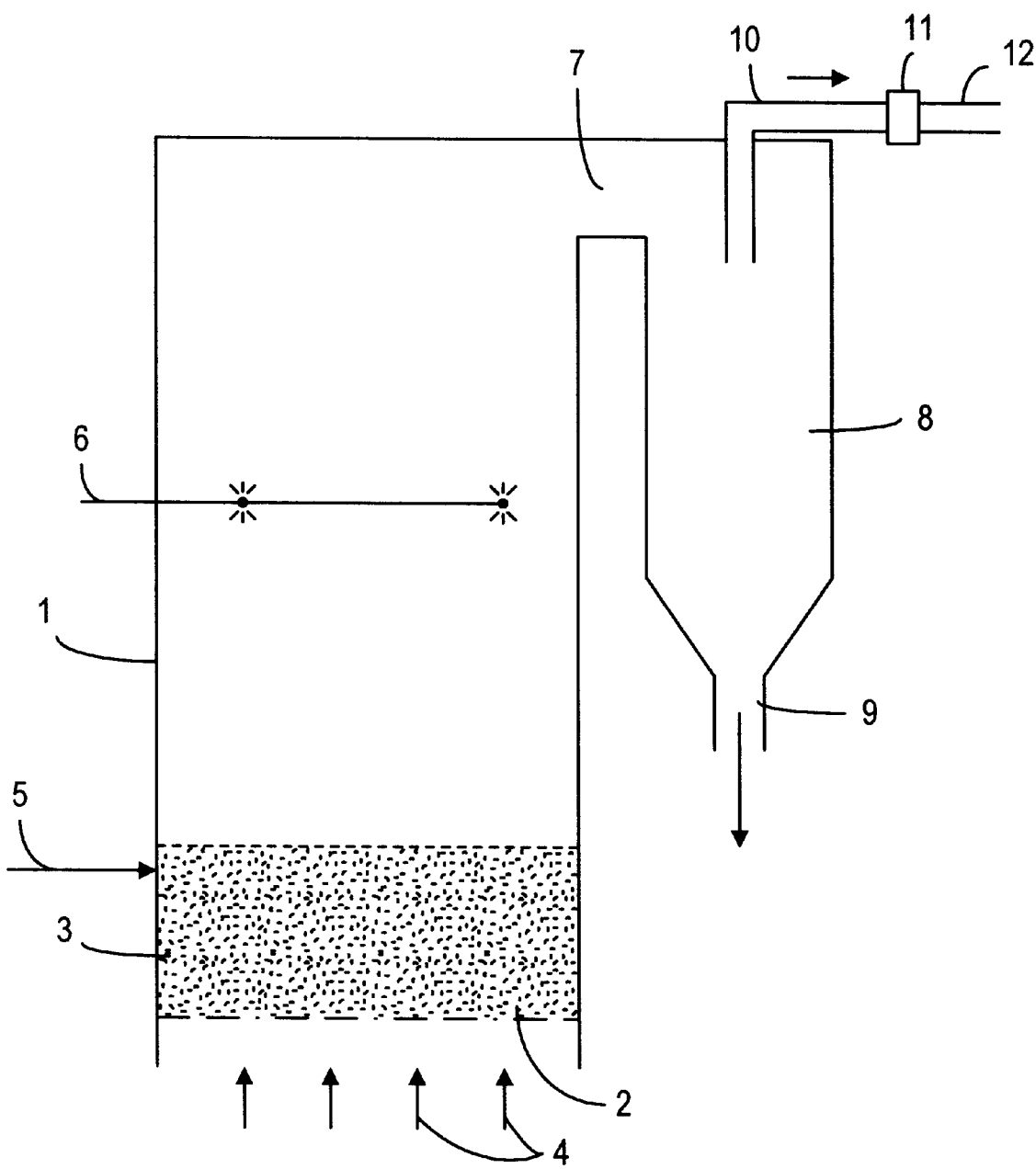
FIG. 1 is a diagrammatic representation of the equipment used to carry out the process of the invention.
Figure 2:
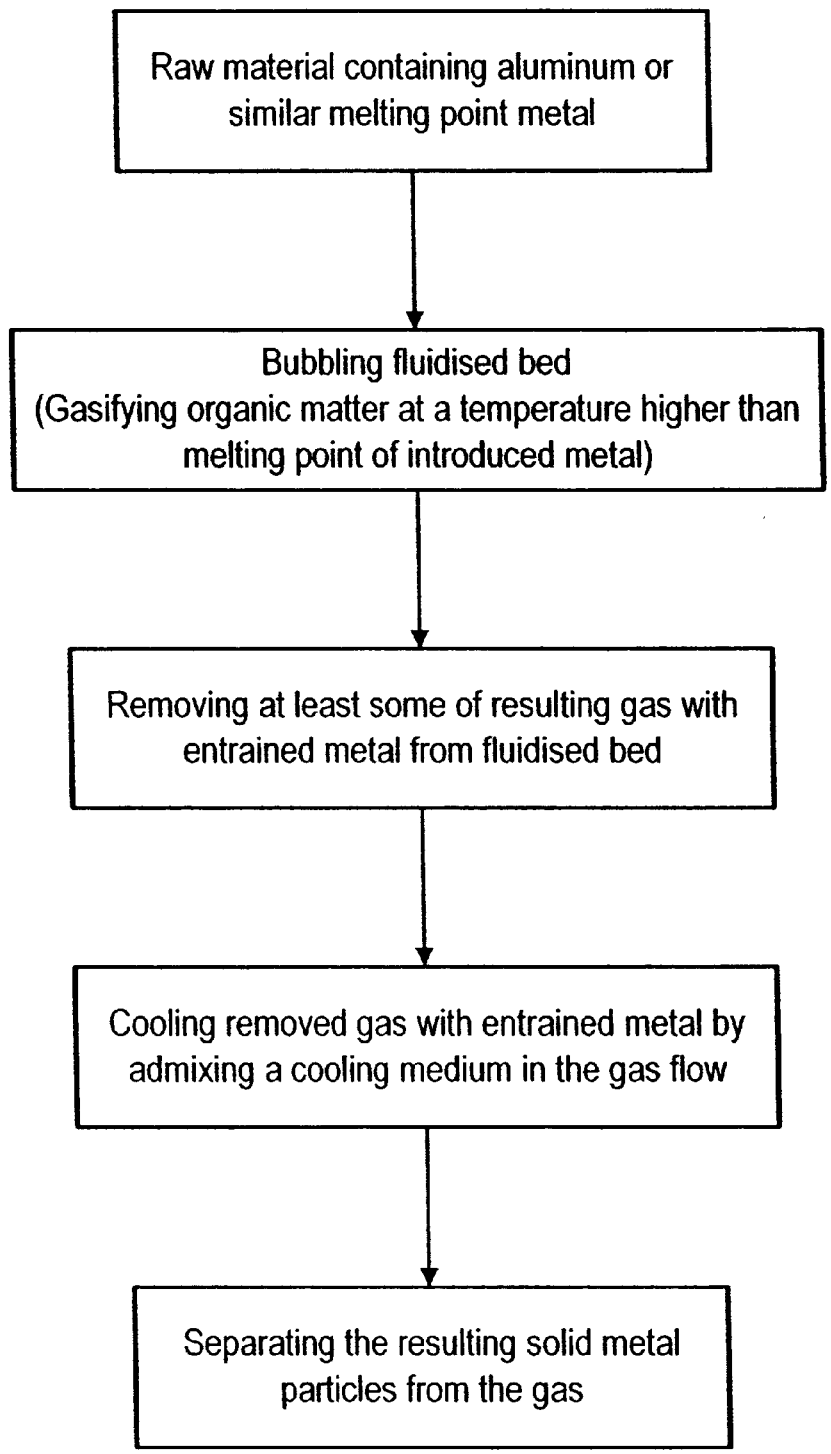
FIG. 2 is a flow chart illustrating the steps carried out by the method for treating a raw material containing aluminum or other similar metal melting at a low temperature, and organic matter, according to the present invention.

The equipment comprises a vertical reaction vessel 1 having plane walls and acting as a fluidised-bed reactor, and comprising at the bottom part a grate 2 and on top of this a bubbling fluidised bed 3, which is fluidised in air flow 4 ascending from the bottom upwards. The particles suspended in the fluidised bed 3 are for instance sand grains of an approx. size of 0.3 to 1.0 mm. The material to be treated can be introduced in the fluidised bed 3 (arrow 5), and in the top part of reaction vessel 1 feed pipes 6 are provided for the cooling medium to be injected into the gas flow ascending within the reaction vessel. The upper end of reaction vessel 1 is connected to cyclone 8 with a duct 7 in order to separate solid particles entrained by the gas. The separated solid particles are removed through the lower end 9 of the cyclone, and the gas flow continues through duct 10 to filter 11 for final separation of the remaining solid matter. The gasified gas obtained proceeds in duct 12 to gas combustion.

The material to be treated and gasified in the equipment is typically package waste 5 consisting of metallic aluminium, polymer material and minor fibrous residues, which is introduced as approx. 0.5 to 5 mm pieces in fluidised bed 3 from the sides or from below. In this case, the gasification temperature prevailing in the fluidised bed is appropriately approx. 850° C. The gas formed by the organic matter and the particles formed by metal and ashes, which may be at least partly in a molten state, rise upwards in reactor 1, reaching cooling medium 6, such as cold water injected into the reactor space, in the upper part of the reactor. The gas temperature then drops below 600° C., at which the entrained particles turn solid. After this, cyclone 8 separates the solid aluminium particles from the gas flow, which is burnt after filtering 11 in order to produce energy.

EXAMPLE 1

Liquid container rejects consisting of aluminium foil, polyethyelene plastic and a small amount of fibres were gasified in a fluidised bed in test equipment, in which the inner diameter of the reactor was 154 mm and the effective height from the grate surface to the gas exhaust duct approx. 7.5 m. The following table 1 sets out the principal parameters of the finely divided reject.

TABLE 1

|  | Variation range | Mean value |
|---|---|---|
| Humidity, % by weight | 0.70–11 | 0.93 |
| In dry substance, % by weight |  |  |
| ashes | 13.1–14.9 | 13.9 |
| carbon C | 64.2–65.7 | 64.7 |
| hydrogen H | 9.8–10.2 | 10.0 |
| nitrogen N | 0.10–0.20 | 0.18 |
| Volume weight, kg/m$^3$ |  | 350 |
| Particle size distribution, % by weight |  |  |
| >3.15 mm |  | 16.9 |
| 2.00–3.15 mm |  | 32.1 |
| 1.00–2.00 mm |  | 37.6 |
| 0.50–1.00 mm |  | 10.1 |
| 0.25–0.50 mm |  | 1.9 |
| <0.25 mm |  | 1.4 |

Due to the narrow reaction space in the test equipment, the reject had been chopped into a more finely divided form than would have been the case in a full-scale industrial gasification plant.

The particles suspended in the fluidised bed were sand grains with a main diametre of 0.5 to 1.0 mm. The fluidised bed was kept in a fluidised state by means of a gas flow conducted from below the grate, which was a mixture of air and water vapour, so that the air flow rate was 6.7 g/s and the water vapour flow rate 0.75 g/s. The reject to be gasified was introduced in the bottom part of the fluidised bed by means of a screw conveyor so as to obtain a reject mass flow rate of 2.8 g/s, the air coefficient being 0.24. The gasification temperature was 815° C. in the fluidised bed, and the calculated fluidisation rate at this temperature was 1.2 m/s. A mixture of water and nitrogen was injected into the reactor space approx. 1.5 m above the reject feeding point through two nozzles with a diametre of 1.5 mm and 1.7 mm respectively. Due to the small size of the test equipment, the injection could not be optimally arranged. A temperature of 545° C. was measured for the gas flow cooled by injection in the reactor top, and 35 m$^3$ n/h as the flow rate of the dry product gas.

The vital parameters of the gasification and the yielded gas are shown in table 2. The overall duration of the gasification test was 8 h, and no problems were detected in the process over this period. Due to the risk of the suspended particles agglomerating under the effect of molten aluminium, samples were taken of the sand particles during the test. However, these samples did not show any signs of sintering. After the test, the reject feed screw was removed and the interior of the reactor space was checked with a mirror in order to detect any deposits. No deposits were detected in the inspection.

EXAMPLE 2

The finely divided liquid container reject (cf table 1) of example 1 was gasified in the equipment of example 1, essentially under the conditions defined in example 1, except for the fact that the reject feed rate was 4.0 g/s and that pure gas was used as the gasification gas with an air coefficient of 0.19. The gasification temperature was 825° C. in the fluidised bed. The higher gasification power was due to the fact that air has higher reactivity than water vapour. The main parameters of the gasification test are shown in table 2.

EXAMPLE 3

The gasified reject and the equipment were identical to those used in example 1. The gasification gas consisted of a mixture of air and water vapour with an air coefficient of 0.29, and the reject feed rate was 2.3 g/s. The gasification temperature was 855° C. in the fluidised bed, and the temperature of the product gas was 560° C. after injection cooling. The test parameters are indicated in table 2.

TABLE 2

| Example | 1 | 2 | 3 |
|---|---|---|---|
| Air coefficient | 0.24 | 0.19 | 0.29 |
| Temperature of fluidised bed, ° C. | 815 | 825 | 855 |
| Temperature in the reactor top, ° C. | 545 | 545 | 560 |
| Pressure difference of the fluidised bed, mbar | 79 | 75 | 78 |
| Mass flow rate of the reject, g/s | 2.8 | 4.0 | 2.3 |
| Mass flow rate of sand, g/s | — | — | — |
| Primary air, g/s | 6.7 | 7.7 | 7.0 |
| Water vapour, g/s | 0.75 | — | 0.77 |
| Cooling water, g/s | 1.7 | 1.8 | 1.8 |
| Nitrogen, g/s | 4.3 | 4.4 | 4.3 |
| Steam/fuel ratio, kg/kg – daf | 0.30 | — | 0.38 |
| Gas rate in the fluidised bed, m/s | 1.2 | 1.2 | 1.3 |
| Product gas flow, $m^3n/h$ | | | |
| dry gas | 35 | 40 | 35 |
| humid gas | 49 | 52 | 50 |
| Dry gas composition, % by volume | | | |
| CO | 4.75 | 5.02 | 4.00 |
| $CO_2$ | 7.06 | 7.48 | 7.70 |
| $H_2$ | 2.32 | 2.60 | 2.10 |
| $N_2$ (+Ar) | 76.9 | 74.1 | 80.0 |
| $CH_4$ | 2.81 | 3.50 | 2.17 |
| $C_2H_2$ | 0.91 | 0.73 | 0.65 |
| $C_2H_4$ | 4.12 | 5.21 | 2.97 |
| $C_2H_6$ | 0.22 | 0.27 | 0.11 |
| $C_3H_6$ | 0.55 | 0.65 | 0.20 |
| $C_3$—$C_5H_y$ | 0.34 | 0.43 | 0.15 |
| Carbon conversion, % by weight | | | |
| to dry gas, (. . . $C_5H_y$) | 83.8 | 75.3 | 78.9 |
| to gas + heavy hydrocarbons | 99.2 | 98.9 | 99.3 |
| Carbon losses, % by weight | 0.7 | 0.9 | 0.6 |
| Calorific value of product gas, MJ/kg | 8.5 | 10.8 | 6.7 |
| Contained in the cyclone dust metallic aluminium, % | 72.8 | 71.6 | 68.1 |
| Contained in the cyclone dust carbon, % | 2.1 | 3.0 | 1.8 |
| Aluminium recovery, % | 91.9 | 81.7 | 83.0 |
| Dust content of the product gas $g/m^3$ | 3.7 | 3.7 | — |

Calculated as gas and heavy hydrocarbons in the gasified reject, the carbon conversion obtained in the tests was high in all of the cases. The calorific values of the product gas has been calculated without nitrogen injected into the gas during cooling or in any other connection.

In the exemplifying tests, the aluminium particles were separated from the product gas with a cyclone. Beside metallic aluminium, the cyclone dust contained carbon and oxidised aluminium ($Al_2O_3$) as impurities. The recovery of the aluminium contained in the reject as metallic aluminium during cyclone separation ranged from 81.7 to 91.9%. The deficit was mainly due to oxidation to aluminium oxide, and in addition, a minor portion of the aluminium passed through the cyclone.

It is obvious to those skilled in the art that the various embodiments of the invention are not restricted to the examples described above, but may vary within the scope of the accompanying claims.

What is claimed is:

1. A process for treating a raw material containing aluminum, wherein the raw material further contains organic matter including polymer material and residual fibres comprising the steps of:

generating a bubbling fluidised bed (3) in a reaction vessel (1), the bubbling fluidised bed containing inert particulate matter so that the bubbling fluidised bed has a controllable height in a reaction space of the reaction vessel (1); gassifying the organic matter at a temperature higher than the melting point of the aluminum forming part of the raw material so as to generate an ascending gas flow containing the gasified organic matter with entrained metal therein above the bubbling fluidised bed (3); admixing a cooling medium (6) in the gas flow containing the gassified organic matter with entrained aluminum therein, so that the gas and the entrained aluminum therein are cooled to below the melting point of the aluminum, wherein the cooling medium is fed to an upper part of the reaction vessel (1) in the space above the bubbling fluidised bed (3); and separating solid aluminum particles (8) from the cooled gas.

2. A process as claimed in claim 1, characterised in that the raw material (5) is introduced in the fluidised bed (3) mainly as pieces having a diameter in the range from approximately 0.5 to 5 cm.

3. A process as claimed in claim 2, characterised in that the inert particulate matter forming part of the fluidised bed (3) consists of substantially ungrindable particles.

4. A process as claimed in claim 3, characterised in that the gasification temperature is in the range from approximately 670 to 900° C.

5. A process as claimed in claim 3, wherein the gasification temperature is approximately 850° C.

6. A process as claimed in claim 3, wherein the ungrindable particles are selected from the group consisting of sand and aluminum oxide.

7. A process as claimed in claim 4, characterised in that the gasification is performed in a vertical reaction vessel (1)

with straight walls, and that the cooling medium (6) is injected in the ascending gas flow in the upper part of the reaction vessel, above the fluidised bed (3).

8. A process as claimed in claim 7, characterised in that the cooling medium is water.

9. A process as claimed in claim 7, characterised in that the cooling medium is cold nitrogen gas.

10. A process as claimed in claim 9, characterised in that the solid metal particles are separated from the gas flow by means of a cyclone (8).

11. A process as claimed in claim 10, characterised in that the gas flow is filtrated (11) to separate solid particles from the gas flow.

12. A process as claimed in claim 11, characterised in that the gas from which the metal particles have been separated is burned in order to produce energy.

13. A process according to claim 1, wherein the raw material is a packaging waste fraction.

14. A process for treating a raw material containing aluminum or a similar metal melting at a low temperature, wherein the raw material further contains organic matter, comprising the steps of:

generating a bubbling fluidised bed (3) in a reaction vessel (1) with straight walls, the bubbling fluidised bed containing inert particulate matter so that the bubbling fluidised bed has a controllable height in a reaction space of the reaction vessel (1); gassifying the organic matter at a temperature higher than the melting point of the metal forming part of the raw material so as to generate an ascending gas flow containing the gassified organic matter with entrained metal therein above the bubbling fluidised bed (3); injecting a cooling medium (6) into the ascending gas flow containing the gassified organic matter with entrained metal therein, so that the cooling medium is admixed with said gas flow and the entrained metal therein is cooled to below the melting point of the metal, wherein the cooling medium is injected to an upper part of the reaction vessel (1) in a space above the bubbling fluidised bed (3); and separating the solid metal particles (8) from the cooled gas.

* * * * *